July 10, 1928.
LA MONT A. McDOWELL
SEAT CONSTRUCTION
Filed July 9, 1925
1,676,456
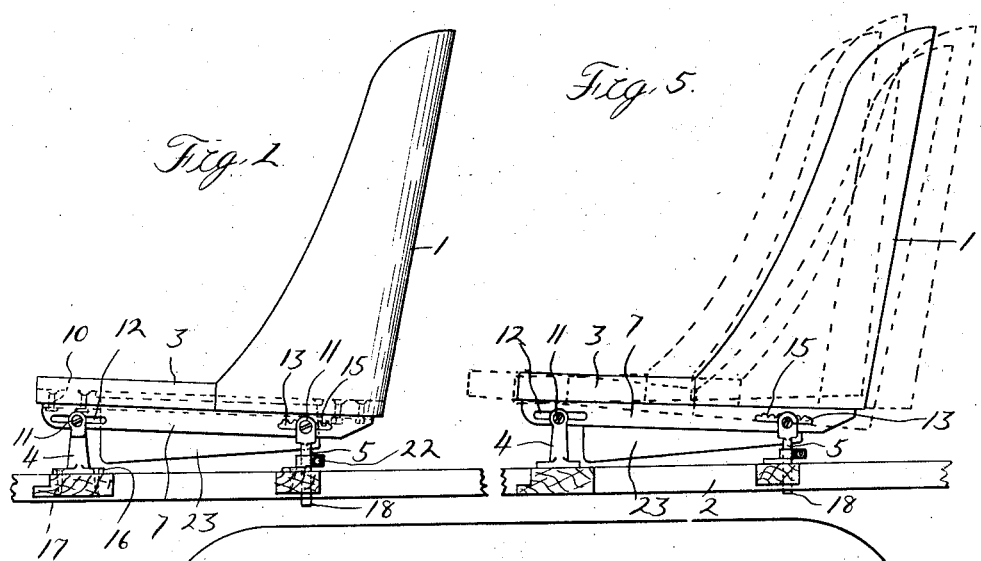
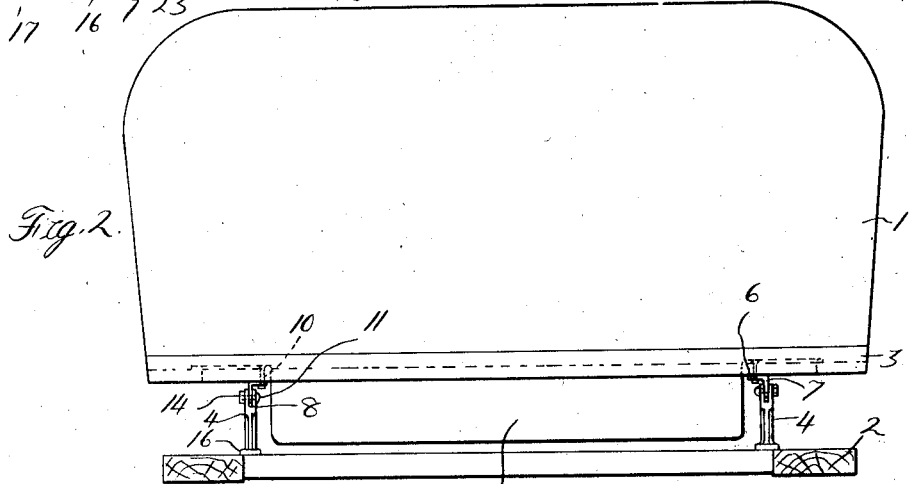
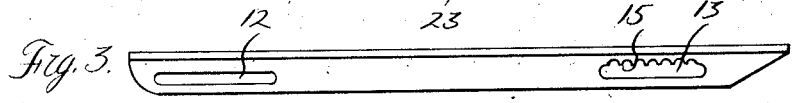
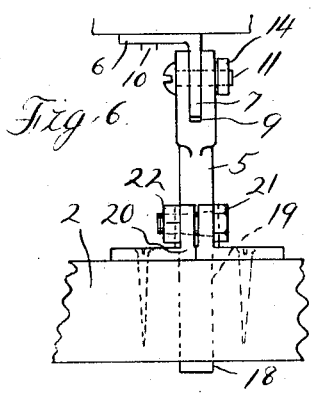
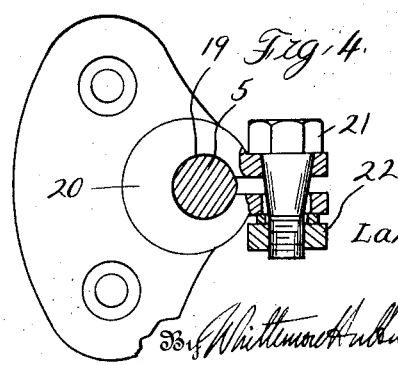
Inventor
LaMont A. McDowell
By Whittemore Hulbert Whittemore Belknap
Attorneys Patented July 10, 1928.

1,676,456

UNITED STATES PATENT OFFICE.

LAMONT A. McDOWELL, OF RACINE, WISCONSIN.

SEAT CONSTRUCTION.

Application filed July 9, 1925. Serial No. 42,416.

This invention relates generally to seat constructions and refers more particularly to adjustable seats designed for use in bodies of motor vehicles.

One of the essential objects of the invention is to provide a seat of this type that is capable of being tilted or adjusted longitudinally with respect to the floor of the vehicle to accommodate persons of different sizes in rear of the usual steering wheels of such vehicles.

Another object is to provide a seat that may be readily installed and may be easily and quickly adjusted to the desired position after the installation has been made.

A further object is to provide a simple and effective means for detachably holding the seat in any adjusted position.

Still another object is to provide a strong and durable seat which is simple in construction and can be manufactured at a comparatively low cost.

With the above and other objects in view the invention consists in certain novel features of construction, combinations and arrangement of parts as will be more fully described and particularly pointed out in the appended claims.

In the accompanying drawings:

Figure 1 is a vertical fragmentary sectional view through the floor of a vehicle body and showing a seat embodying my invention mounted thereon.

Figure 2 is a front elevation of the seat mounted on the floor.

Figure 3 is a detail view of one of the rails.

Figure 4 is a top plan view of one of the split collars.

Figure 5 is a diagrammatic view of the seat in various adjusted positions with respect to the floor of the vehicle body.

Figure 6 is an enlarged fragmentary end elevation of the seat.

Referring now to the drawing, the numeral 1 designates a seat that is adapted to be tilted or adjusted longitudinally with respect to the floor 2 of a vehicle body. As shown, this seat is provided with a flat bottom or base 3 and is supported by suitable brackets 4 and 5 respectively which are connected to the floor 2, preferably in rear of the usual steering wheel (not shown) to accommodate the driver of the vehicle.

In order that the seat 1 may be moved longitudinally of the floor 2, the base 3 of the seat is preferably provided on its lower face with two longitudinally extending rails 6 having depending longitudinally extending flanges 7 that are disposed in aligned vertical slots 8 and 9 respectively in the upper ends of the brackets 4 and 5. Any suitable means such as the bolts 10 may be used to secure the rails 6 to the base 3 of the seat, while any suitable means such as the bolts 11 may be employed for connecting the brackets 4 and 5 respectively to the depending flanges 7 of the rails. As shown, these bolts 11 extend transversely of the brackets 4 and 5 respectively, through elongated slots 12 and 13 respectively in the flanges 7 and are held in adjusted position by means of suitable nuts 14. Thus, with this construction, when the nuts 14 are loosened the seat 1 may be readily adjusted forwardly or rearwardly on the bolts 11 to the desired position and may then be held in such position by tightening the nuts 14.

To prevent the seat 1 moving accidentally, for instance if the nuts 14 should work loose while the seat is in use, the upper edges of the rear slots 13 are preferably scalloped to provide a series of arcuate-shaped recesses 15 for receiving the rear bolts 11. Thus, the combined weight of the driver and seat, or in fact the weight of the seat alone will suffice to hold the rear bolts 11 in engagement with the proper recesses 15 to thereby prevent any accidental longitudinal movement of the seat.

In order that the seat may be tilted, the forward brackets 4 have relatively flat bases 16 that are secured, preferably by screws 17 to the floor 2, while the rear brackets 5 preferably have cylindrical shanks 18 that are movable vertically in suitable openings 19 in the floor 2 of the vehicle body. Thus, the seat 1 is adapted to swing on the forward bolts 11 which constitute suitable fulcrums therefor. For holding the seat 1 in adjusted position, I preferably provide suitable split collars 20 that are secured to the floor 2 and are adapted to be clamped upon the cylindrical shanks 18 of the brackets 5. Any suitable means such as the bolts 21 extending transversely of the split collars 20 may be employed for effecting the clamping action, while suitable nuts 22 may be threaded on the bolts 21 to retain the same in adjusted position. Thus, with this construction, the seat may be adjusted to an inclined position by merely raising or lowering the shanks 18 in the openings 19. Inasmuch as the forward bolts 11 constitute fulcrums for the seat during such tilting movements, the movement of the forward end of the seat will not be very noticeable. However the movement of the rear end of the seat will be sufficient to raise or lower the occupant of the seat to the desired position. For instance, a short person would ordinarily desire the seat elevated so that a better vision could be obtained, while on the other hand a tall person would be satisfied with the seat in lowered position.

If desired, the seat 1 may be provided beneath the base 3 with suitable compartments for receiving tools, accessories and the like. As shown, this compartment comprises a flanged receptacle tray 23 that may be secured by any suitable means to the lower face of the seat base 3.

From the foregoing description it will be apparent that the seat 1 may be readily tilted or adjusted longitudinally of the floor 2 to accommodate persons of different sizes. Although the seat is primarily designed as a driver's seat, it is apparent the same may be readily used in other places whenever found desirable.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

The combination with a support having a vertical opening, a seat spaced above said support, of a longitudinal rail carried by said seat having a depending flange provided with spaced longitudinally extending slots, supporting brackets between said seat and support adjacent the front and rear edges of the seat, fastening elements carried by the upper ends of said brackets and engageable in said slots for permitting the seat to be adjusted longitudinally of the support, the lower end of one of said brackets being permanently secured to said support while the lower end of the other bracket is engaged in said opening for adjusting the seat to a plurality of vertical positions, the fastening element at the upper end of the bracket which is permanently secured to the support forming a fulcrum for said seat during vertical adjustment thereof.

In testimony whereof I affix my signature.

LAMONT A. McDOWELL.